Patented Jan. 1, 1946

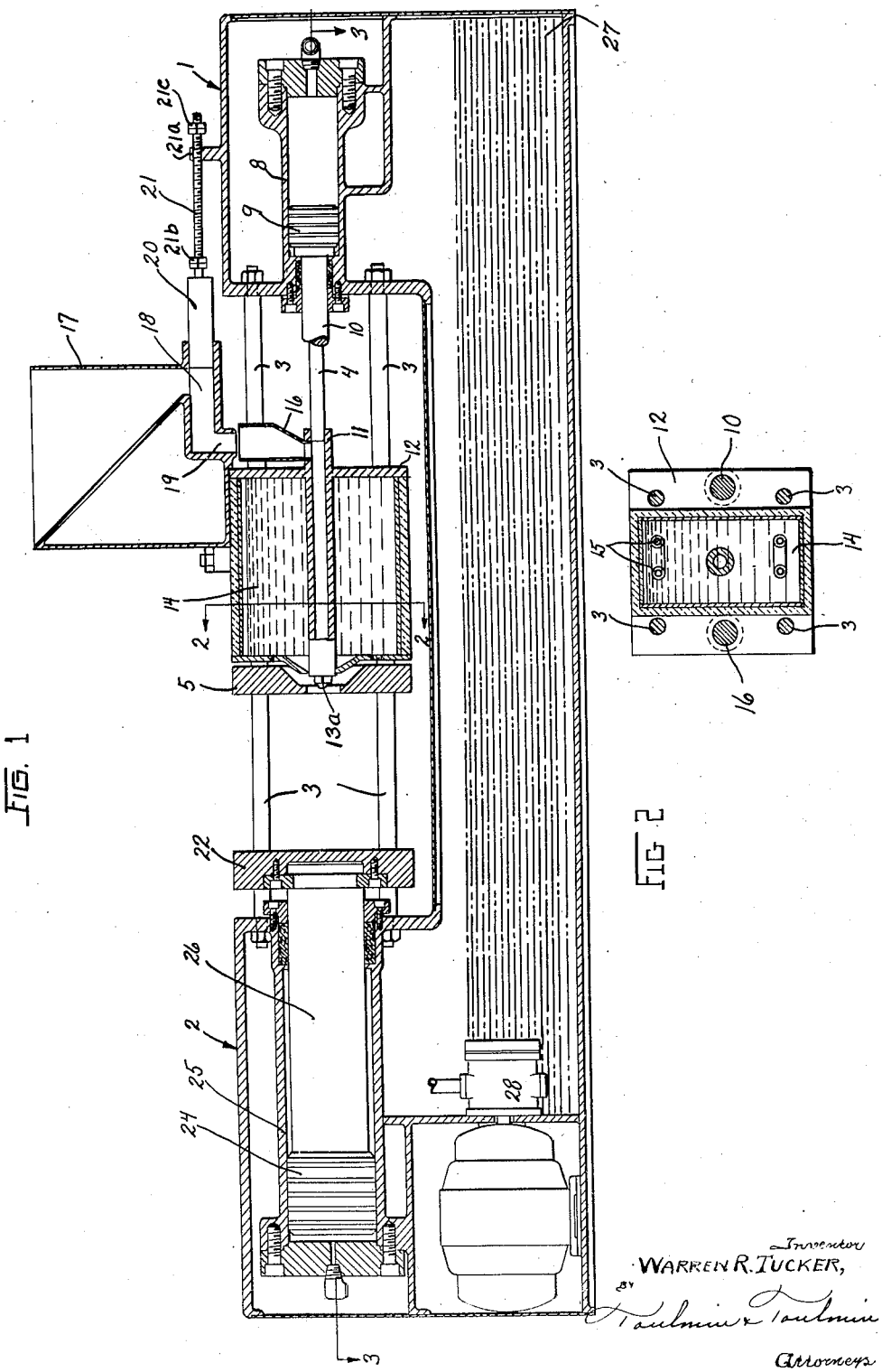

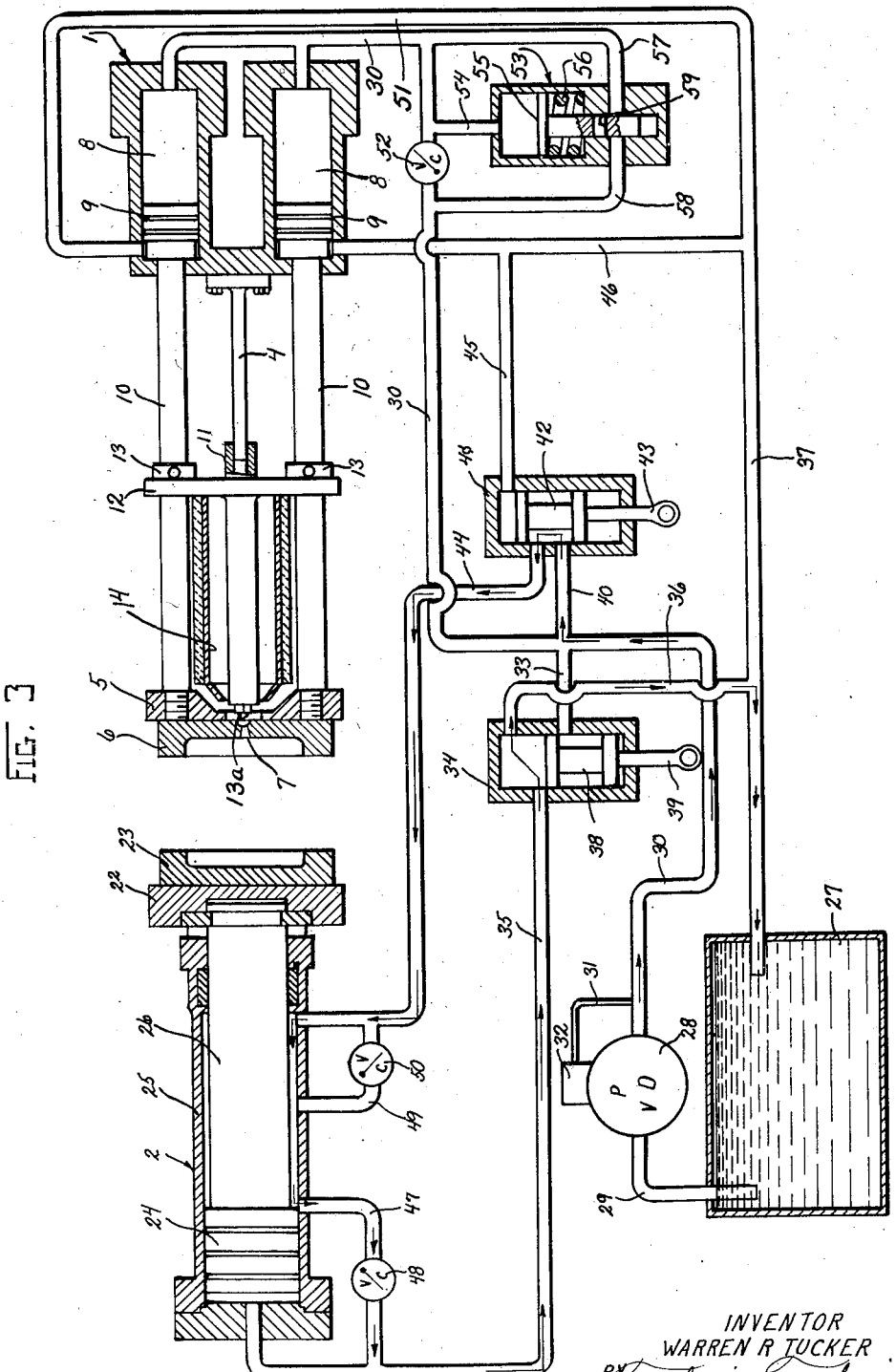

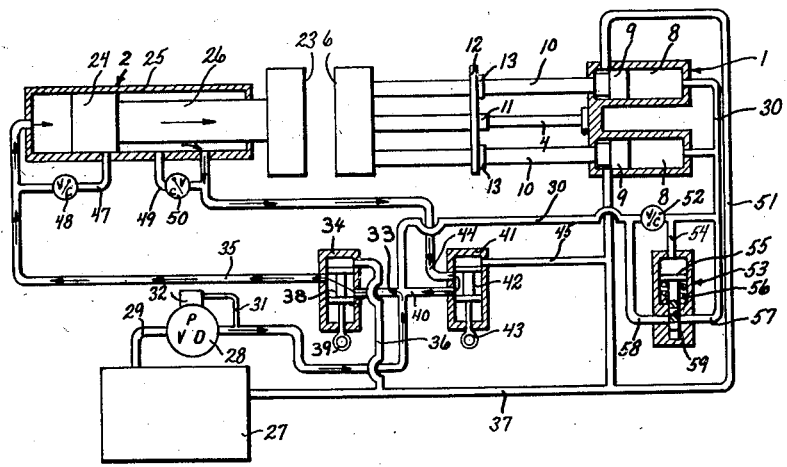
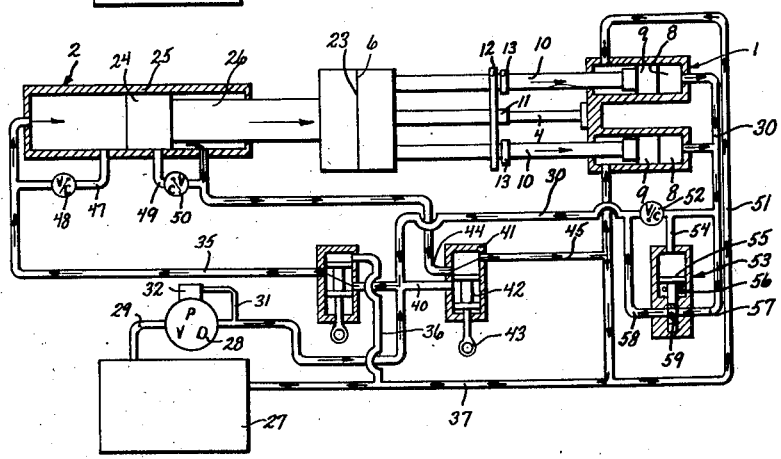
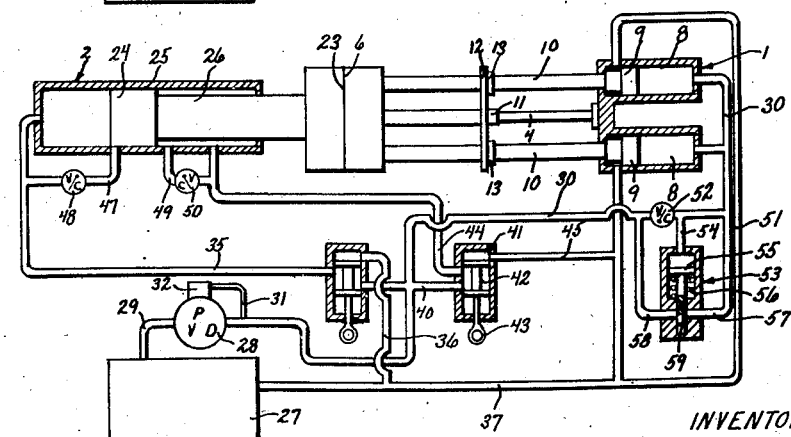

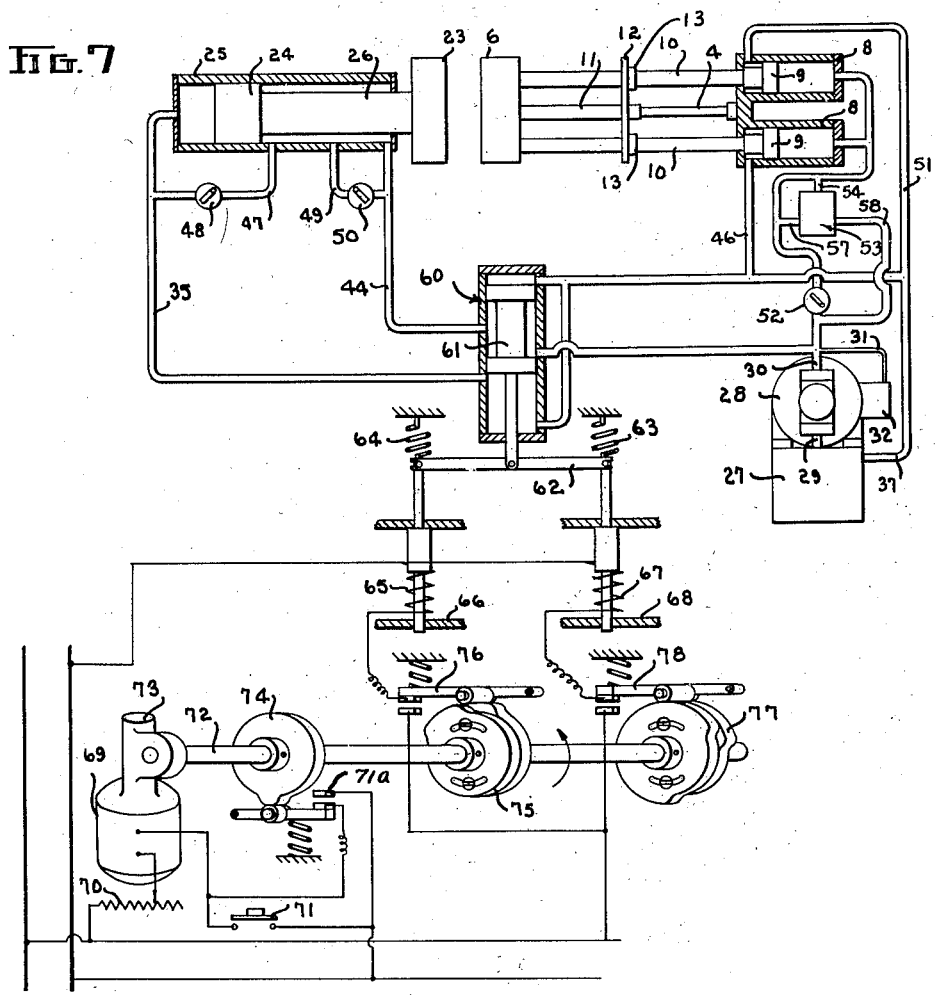
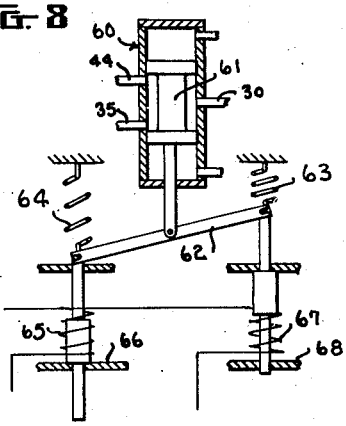
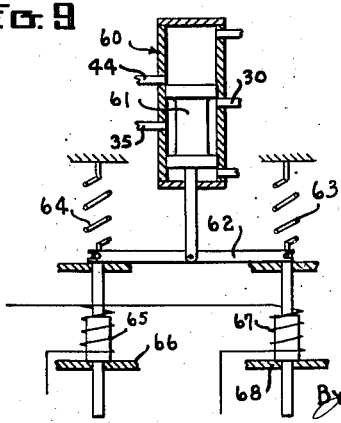

2,392,203

UNITED STATES PATENT OFFICE 2,392,203

HORIZONTAL INJECTION PRESS

Warren R. Tucker, Dayton, Ohio, assignor to The Hydraulic Development Corp., Inc., Wilmington, Del., a corporation of Delaware Application June 21, 1941, Serial No. 399,149

15 Claims. (Cl. 18—30)

This invention relates to an injection molding machine.

It is an object of the invention to construct a machine in which a high degree of simplicity, both of structure and operation, are achieved.

It is an object of the invention to effect the injection and the feeding cycles in a single forward stroke.

It is a further object to accomplish the injection and feeding strokes under the prime action of a single hydraulic motor.

It is an object of the invention to move the injection cylinder relatively to a stationary plunger, doing this through the medium of movable mold members.

It is a further object to provide hydraulic means arranged in opposed relation to the main actuating ram for insuring the clamping of the mold halves before and during the injection stroke. It is a further object to employ the hydraulic means just mentioned for absorbing a part of the thrust of the main hydraulic ram, thereby protecting the injection nozzle from undue mechanical pressure.

It is an object to utilize hydraulic areas under discharge during the cycling of the press for speeding the action of the press.

It is a further object to perform all the motions of the press, including dwell periods, for holding pressure on plasticized material in the molds and for cooling this material to the setting point, by appropriately interconnecting the areas of the main double acting ram and the cushioning rams through hydraulic control means. It is an object of the invention to provide automatic cycling means for operating the hydraulic control means.

Another object is to provide a feeding mechanism for the injector of the press which shall be of greatest simplicity and which shall adequately perform the functions of automatically supplying to the injector quantities of molding material necessary to serve the molds, compensating for variable factors in the feeding, and of providing accurate control of residual quantities of molding material in the injector.

It is a further object to accomplish the feeding cycle simultaneously with the injecting cycle through mechanical means.

It is still another object to provide means for separating the injection nozzle from the molds between the end of one injecting cycle and the beginning of another.

It is a further object to provide with the moving injection cylinder, an integrally moving heating means for controlling the plastic condition of molding material within the injection cylinder.

Still other objects will more fully hereinafter appear.

In the accompanying drawings:

Fig. 1 is a vertical longitudinal section of one form of horizontal injection press involving the principles of the present invention.

Fig. 2 is a vertical transverse section on the line 2—2 of Fig. 1 and shows details of the injection cylinder and the mounting thereof upon the tie rods.

Fig. 3 is a horizontal longitudinal diagrammatic section taken on the line 3—3 of Fig. 1. This view shows the press idling in its retracted position.

Figs. 4 to 6 are generally similar diagrammatic views showing successive stages in a molding cycle.

In these views:

Fig. 4 shows the position of the essential parts of the press during the initial part of the forward stroke wherein the main and push-back spaces are both connected to the source of pressure liquid so as to cause a rapid traverse.

Fig. 5 is a similar view showing the mold halves clamped and showing the injection stroke in progress. The space between the injection nozzle and the adjacent mold half has been absorbed. The hydraulic connections have been altered so as to discharge fluid from cushioning cylinders into the main ram.

Fig. 6 is a similar view showing the apparatus during retraction and specifically at the stopped position during retraction wherein the mold halves are held clamped at dwell so as to allow the molded article to cool.

Fig. 7 is a diagrammatic view of an automatic machine wherein a single five-way valve is employed for controlling the parts instead of the two manually operated valves shown in the preceding views. In this figure the press is shown in the idling position.

Fig. 8 shows the control valve of Fig. 7 shifted to the center position for past traverse preparatory to injection.

Fig. 9 shows the control valve shifted to the bottom position for injection.

Referring to the drawings in detail, 1 designates the stationary head of the press while reference numeral 2 designates the similarly stationary tail stock of the press. Head 1 and tail stock 2 are fixedly connected to one another by means of the horizontal tie rods 3. Fixedly attached to the inward face of the head 1 is the injection plunger 4. Freely slidably mounted on the tie rods 3 is the bolster 5 which carries the mold half 6 which is provided with the usual injection sprue 7.

Formed in the head 1 of the press are a pair of cushioning cylinders 8. Slidably operating within these cylinders 8 are the cushioning pistons 9. Fixedly connecting the pistons 9 with the bolster 5 are the cushioning rods 10. The space behind the cushioning pistons 9 is adapted to be supplied with pressure liquid which forces the bolster 5 towards the head 2, cushioning pistons 9 bottoming against the forward side of the head 1 in a manner which will be obvious. This bottoming of pistons 9 limits the travel of bolster 5 and thus of mold half 6 away from the press head 1.

Slidably mounted between injection plunger 4 and bolster 5 is an injection cylinder 11 which is slidably mounted on tie rods 3 and the cushioning rods 10 by means of the integral plate 12 which is adjacent the rear of injection cylinder 11 and which slidably engages these rods 3 and 10. This injection cylinder 11 is provided with the usual injection nozzle 13a at its forward end, which nozzle is adapted to engage the sprue 7 in the mold half 6. In order to limit the separation of injection cylinder 11 from bolster 5, the collars 13 are provided on the cushioning rods 10. These collars 13 thus insure that when the bolster 5 is projected outwardly away from head 1, injection cylinder 11 is carried therewith away from the injection plunger 4 although injection cylinder 11 is free to slide along rods 10 into engagement with the mold half 6.

Associated with injection cylinder 11 is a heating unit for rendering molding material in this cylinder plastic, and for accurately controlling the temperature of the material in its plasticized state. This heating unit consists of a closed, insulated jacket 14 containing a suitable fluid medium, and electrical heating elements 15 of the immersion type spaced in the fluid medium. Heat derived from these elements 15 is transferred evenly by the fluid to the walls of cylinder 11, the fluid circulating according to connection principles to produce this transfer. It will be noted that the entire heating unit is self-contained, thus requiring no external connections other than power lines to the electrical heating elements, and that this self-contained unit is movable with the movable injection cylinder 11, being rigidly attached to the latter.

Provision for feeding the injection cylinder for each stroke is made by the small charging hopper 16 fixedly carried by the injection cylinder 11 at the rear thereof, this hopper 16 extending into communication with the interior of injection cylinder 11 through a suitable passageway in the upper wall of injection cylinder 11. Moving with the injection cylinder 11 is a feed hopper 17 which leads downwardly into a feed cylinder 18 which is connected by means of the elbow 19 so as to discharge into charging hopper 16. This feed cylinder 18 may be of different displacement from that of injection cylinder 11, as is shown in the drawings.

Material is measured from the bulk carried in hopper 17 by the cooperation of cylinder 18 with a plunger 20. This plunger carries, at its outer ends, a threaded extension 21 which is slidably supported in a projection 21a of the press head 1. Mounted threadably upon the rod 21 for purposes of adjustment are nuts 21b and 21c.

In operation, the feeding mechanism acts to supply granular resin to the injection cylinder 11 in the desired quantities, with compensations for slight variations in quantity, and with adjustable control over the residue left in the injection cylinder after an injection stroke. Specifically the action is as follows. Let it be assumed that injection cylinder 11 has just started its forward movement under the influence of ram 26. The feed cylinder 18, being integrally mounted upon extensons of injection cylinder 11, begins its forward movement at the same instant. However, its initial movement does not necessarily produce a feeding of granular material, the plunger 20 being carried along with cylinder 18 through a lost motion stroke until adjustable stops 21b strike projection 21a. As soon as the latter action is accomplished relative movement between cylinder 18 and its associated plunger 20 begins, and material is fed from cylinder 18 and elbow 19 into the receptacle 16 so long as the injection stroke continues. The duration of the injection stroke is determined by the amount of material contained within cylinder 11 and the capacity of the particular molds being used at the time. In normal operation, the injection stroke will be just long enough to feed from cylinder 18 an amount of granular material sufficient to replace the amount taken by the molds. Upon the retraction stroke of the injection cylinder, plunger 20 remains in cylinder 18 until adjusting nuts 21c abut projection 21a, at which time the motion of plunger 20 is arrested and further movement of cylinder 18 brings the feeder to its starting position. Near the end of the reverse stroke, the measured quantity of material held in the receptacle 16 is discharged by gravity into injection cylinder 11.

In the event that any variable factor is introduced into the feeding operation, it will be evident that the succeeding injection stroke will thereby be affected. For instance, if a slight under-feeding takes place during one injection cycle, the amount of material contained in the injection cylinder at the start of the next cycle will be decreased. The result will be a longer stroke of the injection cylinder 11 over its associated plunger 4 in order to properly fill the mold cavities. This in turn, will result in a longer relative stroke between feed cylinder 18 and feed plunger 20, so that an extra quantity of granular resin is fed to compensate for the previous deficiency. In other words, since the exact feeding stroke is dependent upon, and varies directly with the injection stroke, the effect of variables is automatically compensated for.

The purpose of the adjusting nuts 21b and 21c is to provide the operator a manual control over the residue in injection cylinder 11, proper control of this type being necessary to insure the desired preheating and conversion into plasticized form of the granular material introduced by the feeding mechanism. The use of the adjusting nuts may be explained by the following example. Suppose that the operator, upon the examination of finished work pieces, decides that, for the particular resin being employed, it is desirable to increase the residue in injection cylinder 11. He may then move nuts 21b toward the right along threaded rod 21. Upon the next succeeding injection cycle, feeding of granular material will start sooner than previously, and will thus deliver a greater amount to the receptacle 16. It is evident that the following stroke of the injection cylinder will be shorter since injection plunger 4 will contact the heated material sooner, and, since the amount required by the molds is a constant. The shorter injection stroke will, of course, result in the desired increase in residue. To counteract the effect of a reduced feeding stroke during this shorter injection stroke, the operator may advance adjusting nuts 21b still further to the right and, thus, eventually stabilize the residue in injector cylinder 11 at the point of optimum heating action.

Slidably mounted upon the tie rods 3 is a second bolster 22 which carries the cooperating mold half 23. The bolster 22 is adapted to be moved by means of the hydraulic piston 24 operating within the hydraulic cylinder 25 fixedly carried by the tail stock 2, bolster 22 being connected to piston 24 by means of the ram or plunger 26. Thus a differential double-acting hydraulic motor is provided for actuating the mold half 23, it being understood that the main injecting space is that behind the piston 24, and that the push-back space is the much smaller space ahead of the piston 24 and around the ram 26.

Hydraulic circuit

The hydraulic liquid such as oil is derived from a supply tank 27. A one-way variable delivery pump 28 draws liquid from tank 27 through conduit 29 and delivers it into conduit 30. In order to shift the pump 28 towards neutral when a certain pressure has been built up in conduit 30 and in hydraulic spaces in connection therewith, the conduit 31 is provided leading from the outlet conduit 30 to a servomotor 32 of conventional type. This shifting of pump 28 towards neutral is done only at the end of the injection stroke for the purpose of holding the molded article under the injection pressure for a desired period of time.

The outlet conduit 30 leads by way of a branch line 33 to the inlet port of a manually operated three-way valve 34 which is adapted to control the application of fluid pressure to the left-hand or main side of the piston 24. A conduit 35 leads from a service port of valve 34 to the main pressing space at the left of piston 24. A return conduit 36 leads from a return port 34 to a return line 37. The valve member in valve 34 is designated 38, has the spaced heads which balance it, and is adapted to be operated by vertical manual movement of the handle 39. When the valve member 38 is disposed downwardly the conduit 35 is connected to the return conduit 36 and the supply conduit 33 is cut off. When the valve member 38 is moved upwardly, supply conduit 33 is connected to conduit 35 and the return conduit 36 is cut off.

A branch line 40 leads from supply conduit 30 to a valve 41 which is of the three-way type and which has the valve member 42 operated by the manual handle 43. The service port of valve 41 is connected by a conduit 44 to the right hand end of the cylinder 25. A conduit 45 connects the return port of valve 41 to a return line 46 which leads to the return line 37. Valve 41 is thus adapted to control the delivery of pressure liquid to the push-back space. When valve member 42 is disposed upwardly, it connects supply conduit 40 with conduit 44 and when it is downwardly, it connects conduit 44 to the return conduit 45 and shuts off the supply line 40.

To limit the travel of piston 24 in either direction and to prevent injury to the mechanism, the usual over-travel ports are provided in the cylinder 25. The over-travel line 47 having the check valve 48 limits the retraction stroke of the piston 24. The over-travel line 49 having the check valve 50 and leading to conduit 44 likewise limits over-travel of piston 24 in the injection stroke.

The line 46 connects the return line 37 to one of the cushioning cylinders 8 on the forward side of the cushioning piston 9 so as to provide for the venting of cushioning piston 9 as it moves to and fro in the cushioning cylinder 8. A similar line 51 connects the corresponding side of the other cushioning piston 9 to the return line 37.

The conduit 30 connects by means of two branches at its ends to the cushioning side of the cushioning pistons 9. A check valve 52 is disposed in this conduit 30 so that liquid under pressure is free to flow into the cushioning spaces, but is prevented from returning by way of check valve 52. In order to allow the outflow of pressure liquid from the cushioning spaces to the right of cushioning piston 9 after a predetermined pressure has been built up therein the unloading valve 53 is provided. This valve is adapted to be actuated when a predetermined pressure has been built up in the cushioning spaces. A line 54 transmits liquid pressure from the conduit 30 into the unloading valve, and this pressure is effective to move the valve element 55 downwardly against the action of spring 56 to connect line 57 leading from line 30 with line 58 by means of the port 59 in the plunger of valve element 55.

Operation

When the press is idling, the parts assume the position of Fig. 3 in which the valve element of valve 34 is down and the valve 41 is up. This position of the valves causes the pressure output of pump 28 to be applied to the right-hand of piston 24, thereby holding mold half 23 retracted. The output of pump 28 is bypassed by means of the over-travel conduit 47 into the line 35 which is connected by valve 34 back to the tank 27. At the same time, pressure stands in conduit 30 and in the cushioning spaces of the cushioning cylinders, thus holding the mold half 6 projected away from press head 1, cushioning pistons 9 being bottomed in their cylinders.

To begin an injection stroke, the operator moves the valve element in valve 34 upwardly so as to connect the main pressing area to the pump output simultaneously with the push-back area. The condition of the press at this time is shown in Fig. 4. Since the main area is greater than the push-back area, this causes rightward movement of the mold half 23 towards the injection plunger 4. The simultaneous connection of the push-back area and the main area to the source of pressure liquid causes a rapid traverse of the mold half 23 towards the press head 1, the liquid squeezed out of the push-back space being forced through valve 41 by way of pipe line 44 whence it passes into the main pressing space through pipe line 40, valve 34 and pipe line 35, thus reducing the effective area of the main pressing space and causing more rapid traverse.

When the mold half 23 is about to engage the mold half 6 the operator manipulates the valve element of valve 41 downwardly, thereby connecting the push-back area to the tank. The mold members are then closed and the force of the main ram is imposed upon the cushioning pistons 9 by way of rods 10. The main area, being larger than the combined cushioning areas, overcomes pressure in the latter and initiates the injection stroke.

At this time, the cushioning rams are performing the function of clamping the mold members, the clamping force being equal to the combined thrusts of the cushioning pistons 9.

Liquid squeezed out of the cushioning areas joins the liquid output of the pump and passes to the main pressing area, thereby causing a more rapid injection stroke than would otherwise be obtained. This liquid is squeezed out of the cushioning areas by way of the unloading valve 53 since it cannot pass the check valve 52, and thus the maintenance of a predetermined mold clamping pressure is effected.

During injection, the parts are as in Fig. 5. The initial part of the rightward movement of the clamped mold halves had traversed them into engagement with the nozzle of injection cylinder 11, this cylinder remaining stationary, and integral plate 12 riding on rods 10 away from collars 13 during this period. The injection cylinder is in effect pushed into engagement with the right-hand mold half 6 by the granular plastic in the injection cylinder being engaged by the injection plunger, since the taking up of lost motion in this manner is the line of least resistance, being much easier than actual injection. When the lost motion is thus taken up, the injection cylinder is firmly clamped to the mold halves and is then carried thereby over the injection plunger, causing injection. The force available for injection is the difference between the rightward thrust of ram 24 and the opposed leftward thrust of rams 9. The arrangement is such that the mold halves are clamped to the injection cylinder with a greater force than that of injection, this force being built up before actual injection begins and being at all times during injection greater than the force of injection. Thus, the loss of fluent plastic and unsatisfactory operation are avoided.

It should be noted that the press arrangement protects the injection nozzle during injection. That is, the small area represented by the nozzle is relieved of the full force of the main ram 24, the cushioning rams 9 serving to absorb a large proportion of this force.

Injection is completed when the mold cavity has been filled and no further motion of cylinder 11 can take place. The operator allows the mechanism to stand in this position with pump 28 shifted towards neutral but holding the injecting pressure for the desired period of time.

When it is desired to cause retraction, the operator moves the valve element of valve 41 upwardly, causing the application of fluid pressure to the push-back area. All three motor areas are thus connected to the source of pressure. This causes retraction while holding the mold halves clamped because the force of the cushioning areas plus that of the push-back area exceeds that of the main area. The liquid squeezed out of the main pressing space is conveyed into the cushioning spaces and into the push-back space, thereby causing rapid retraction. Retraction continues until the parts assume the position shown in Fig. 6 at which the cushioning pistons have bottomed and are, therefore, no longer effective to cooperate with the push-back space to cause retraction, and because the push-back space alone is incapable of overcoming the main space.

The apparatus is maintained in this stopped position of Fig. 6 until sufficient time has elapsed to allow the molded article to cool properly. When such time has elapsed, the operator moves the valve element of valve 34 downwardly, thus connecting the main pressing area to the tank and allowing the push-back area to complete the retraction. The overtravel conduit 47 stops the retraction and the parts are now in the position shown in Fig. 3, the mold halves having been separated and the mechanism being in condition for another cycle.

As the injection cylinder 11 traveled over the injection plunger 4, the feed cylinder 18 traveled over the feed plunger 20 and caused feeding of molding material into hopper 16 in a manner described fully above. As the injection cylinder 11 was retracted, being carried by the collars 13 with the mold half 6, feed plunger 20 was retracted in the feed cylinder 18 and a new supply of material flowed downwardly from hopper 17 into the feed cylinder 18.

If desired, the first portion of the retraction may be effected by means of the cushioning pistons 9 alone, the operator shifting the valve element of valve 34 downwardly at the end of the injection. Since both the main and the push-back areas are now connected to the tank, the cushioning area is effective to push the clamped mold halves away from the head 1 until the pistons 9 bottom. Thereafter, further retraction must be by connecting the push-back area to the pump by raising the valve element in valve 41.

In case of any emergency in which it is desired to open the press regardless of its position in the cycle, the operator simply moves the control valves 34 and 41 to the positions of Fig. 1. Doing this causes complete retraction of the main ram in the manner explained above.

*Modification of Figures 7 to 9*

In this embodiment, the two valves 34 and 41 have been replaced by a single valve 60 which is of the five-way type. The push-back conduit 44 is connected to one of the service ports and the main conduit 45 is connected to the other service port. The inlet port is connected to the inlet conduit 30. The return conduit 45 is connected to the top return port of the valve 60 and the return conduit 36 is similarly connected to the bottom return port of valve 60. The valve member 61 is of the balanced spaced head type as before. The arrangement of the ports and the heads of the valve member 61 is such that when valve 61 is in the upper position, the main conduit 35 is connected to the tank and the push-back conduit 44 is connected to the supply conduit 30. When the valve member 61 is in the central position shown in Fig. 8, pressure conduit 30 is connected to both the push-back conduit 44 and the main conduit 35, for rapid traverse. When the valve member 61 is in the lower position, the push-back conduit 44 is connected to the return conduit 45 and the main conduit 35 is connected to the pressure conduit 30.

To actuate the valve member 61, the link 62 pivoted thereto is provided. The springs 63 and 64 normally pull the link 62 in such manner as to maintain the valve element 61 upwardly. Solenoid 65 is adapted to pull one end of the link 62 downwardly until the armature strikes the stop 66, thus shifting the valve element 61 to the central position for traverse. Thereafter, when the solenoid 67 is energized, it pulls the other end of link 62 downwardly until the armature strikes the stop 68, thus shifting the valve element 61 to the downward position.

Automatic timing means is provided for controlling the actuation of solenoids 65 and 67 after an injection stroke has been initiated so as to bring about the proper shifting of the valve 60 so as to cause the injection cycle. This automatic mechanism comprises the variable speed timing motor 69 adapted to have its speed varied by the rheostat 70 and is to be started by manual closing of switch 71 for an instant whereupon a holding circuit is established through contacts 71a. Motor 69 drives a cam shaft 72 through a reduction gearing 73. Mounted on cam shaft 72 is a cam 74 which, after rotating through a slight angle, permits contacts 71a of the holding circuit to close. Also mounted on cam shaft 72 is a cam 75 for controlling the energization of solenoid 65. Immediately when shaft 72 begins to rotate, cam 75 causes closing of a switch 76 which energizes solenoid 65, causing the valve element 61 to be shifted to the central position of Fig. 8 whereby traverse is effected. Also fixedly mounted on the shaft 72 is a third cam 77 which controls the energization of solenoid 67 by opening and closing a switch 78. The cams 75 and 77 each comprise two plates which are adjustable angularly relative to one another and one of which is adjustable angularly relative to the shaft 72 as by means of an integral collar and set screw. In this way, the timing of the various operations is controlled. The timing is further controlled by the variation in speed of motor 69 by means of the rheostat 70.

The cam 77 is operated in such manner as to close the switch 78 at a predetermined time after the beginning of traverse, which time corresponds to the point where the mold halves are first closed. At this time, cam 77 allows its follower to drop into the depression, thereby closing switch 78 and energizing solenoid 67. This causes the right-hand end of link 62 to be pulled downwardly and since the left-hand end has already been pulled downwardly by solenoid 65, this causes the valve element 61 of valve 60 to be shifted to the bottom position of Fig. 9 in which the push-back area is connected to discharge while the main area is connected to the output of the pump. This causes the actual injection stroke. At a predetermined time after the beginning of the injection stroke and after the completion of injection, the cam 77 causes the opening of switch 78, causing shifting of the valve 60 to the central position of Fig. 8, causing application of liquid pressure to the push-back area by way of conduit 44. This causes the first part of the retraction.

This first part of the retraction continues until the cushioning pistons bottom, whereupon the apparatus dwells with the mold halves clamped for a period of time sufficient to allow the molded article to cool. After the lapse of a predetermined time, the cam 75 causes its follower to rise out of its depression, opening switch 76 and causing the de-energization of solenoid 65, causing the valve member in valve 60 to move to the uppermost position of Fig. 7 in which the output of the pump is connected to the push-back area and the main area is connected to discharge. This causes the final retraction to take place with the unclamping of the mold halves.

It will be understood that by the adjustment of the speed at which motor 69 operates and by the adjustment of the timing cams 75 and 77, both with respect to their annular disposition on shaft 72 and with respect to the annular extent of the depression in each of these cams, any desired injection cycle may be obtained. It will be understood by those skilled in the art that the adjustment of the time for rotation of shaft 72 through a single revolution is absolutely essential in order to allow for the molding of different sized articles.

It will be understood that immediately after the cam 75 has caused the switch 76 to open, the shaft 72 will have completed a single revolution and will cause opening of the holding switch 71a by the cam 74, thereby causing stopping of the timing motor 69. Reliance is placed upon the condition of the apparatus just effected to complete the retraction stroke, and upon the overtravel conduit 47 to limit this last portion of the retraction stroke.

I wish it to be understood that I intend to include as within my invention such modifications thereof as may be necessary to adapt the same to varying conditions and uses and as fall within the scope of the appended claims.

Having thus fully described my invention what I claim as new and desire to secure by Letters Patent is:

1. In an injection molding machine, a first movable mold section, a hydraulically operable cushioning motor having a movable element connected to said mold section for actuating the same, a stationary injection plunger, an injection cylinder arranged between said plunger and said mold section and movable relative to said injection plunger so as, in cooperation therewith, to effect an injecting operation, a second mold section for cooperation with said first mold section, a double-acting differential hydraulic motor operable to move said second mold section selectively toward or away from said injection plunger and also being operable to move said first mold section toward said injection plunger against the thrust of said cushioning motor, hydraulic circuit means including a pressure fluid source for conveying pressure fluid to and from said cushioning motor and said differential hydraulic motor, and control means associated with said circuit means and operable selectively to connect said fluid source simultaneously to said cushioning motor and to both sides of said differential motor to bring about fast closing movement of said mold sections, or to connect said fluid source simultaneously to said cushioning motor and the larger area of said differential motor, while connecting the smaller area of said differential motor with an exhaust, thereby bringing about fast movement of said mold sections and said injection cylinder toward said injection plunger.

2. In an injection molding machine, a first movable mold section, a hydraulically operable cushioning motor having a movable element connected to said mold section for actuating the same, a stationary injection plunger, an injection cylinder arranged between said plunger and said mold section and movable relative to said injection plunger so as, in cooperation therewith, to effect an injecting operation, a second mold section for cooperation with said first mold section, a double-acting differential hydraulic motor operable to move said second mold section selectively toward or away from said injection plunger and also being operable to move said first mold section toward said injection plunger against the thrust of said cushioning motor, hydraulic circuit means including a pressure fluid source for conveying pressure fluid to and from said cushioning motor and said differential hydraulic motor, control means associated with said circuit means and operable selectively to connect said fluid source simultaneously to said cushioning motor and to both sides of said differential motor to bring about fast closing movement of said mold sections, or to connect said fluid source simultaneously to said cushioning motor and the larger area of said differential motor, while connecting the smaller area of said differential motor with an exhaust, thereby causing said first mentioned mold section to move toward said injection plunger while conveying pressure fluid expelled from said cushioning motor to the larger area of said differential motor, and means associated with said cushioning motor for maintaining a predetermined but adjustable pressure thereon.

3. In an injection molding machine, a plurality of mold sections adapted selectively to engage each other to form a mold or to be spaced from each other to allow removal of a molded article, an injection unit including a stationary injecting plunger and an injection cylinder movable relative thereto, main hydraulic motor means for closing said mold sections and moving the latter together with said injection cylinder toward said injecting plunger to bring about an injecting operation, fluid operable cushioning means operable to hold said mold sections clamped together during said injecting operation, said cushioning means also being operable to move said injection cylinder and said mold sections away from said injecting plunger, push-back hydraulic motor means for spacing said mold sections from each other, said push-back hydraulic motor means having an effective area smaller than the effective area of said main hydraulic motor means, a source of pressure fluid arranged to continuously convey pressure to said cushioning means, and control means operable automatically to hydraulically connect said source to both of said motor means for rapidly closing said mold sections, for thereafter connecting said push-back motor means to an exhaust while connecting said fluid source to said main motor areas, to move said mold sections and injection cylinder toward said injecting plunger against the thrust of said cushioning means, and for then connecting said main motor means to an exhaust while connecting said source to said push-back motor means to thereby, in cooperation with said cushioning means, return said mold sections and said cylinder to their initial positions.

4. In an injection molding apparatus, a first injection plunger, a first movable mold section, a second movable mold section for engagement with said first mold section, an injection cylinder floatingly disposed between said first mold section and said injection plunger, hydraulic motor means for successively moving said second mold section into engagement with said first mold section and for moving both mold sections toward said injection plunger, a hydraulic cushioning motor having its motive element connected to said first mold section and having means associated therewith for maintaining a constant pressure on said first mold section during a complete cycle of the apparatus, said motor also being operable to project said first mold section away from said plunger, and hydraulic motor means for moving said second mold section away from said injection plunger and spacing it from said first mold section.

5. In an injection molding machine, a main cylinder, a main plunger reciprocable in said main cylinder, an auxiliary cylinder, an auxiliary plunger reciprocable in said auxiliary cylinder, means for selectively admitting pressure fluid to said auxiliary cylinder, control means associated with said auxiliary cylinder for maintaining a predetermined but adjustable fluid pressure therein and releasing the fluid pressure therefrom in excess of said predetermined pressure, a stationary injection plunger, an injection cylinder movable relative to said injection plunger for cooperation therewith, mold sections interposed between said main and said auxiliary plunger, and means for conveying pressure fluid to said main cylinder to cause said main plunger to close said mold sections and to move the same together with said injection cylinder toward said injection plunger against the resistance exerted by said auxiliary plunger for performing an injection operation.

6. In an injection molding machine, a main cylinder, a main plunger reciprocable in said main cylinder, an auxiliary cylinder, an auxiliary plunger reciprocable in said auxiliary cylinder, means for selectively admitting pressure fluid to said auxiliary cylinder, control means associated with said auxiliary cylinder for maintaining a predetermined but adjustable fluid pressure therein and releasing the fluid pressure therefrom in excess of said predetermined pressure, a stationary injection plunger, an injection cylinder movable relative to said injection plunger for cooperation therewith, mold sections interposed between said main and said auxiliary plunger, means for conveying pressure fluid to said main cylinder to cause said main plunger to close said mold sections and to move the same together with said injection cylinder toward said injection plunger against the resistance exerted by said auxiliary plunger for performing an injection operation, and means for conveying pressure fluid released from said auxiliary cylinder in excess of said predetermined pressure to said main cylinder to aid said main plunger in its movement toward said injection plunger.

7. In an injection molding apparatus, primary hydraulic plunger means, secondary hydraulic plunger means, a first mold half supported by said primary plunger means, a second mold half supported by said secondary plunger means, said mold halves being adapted to be closed by hydraulic pressure on said primary and secondary plunger means, a fixed injection plunger, and an injection cylinder movable over said injection plunger and also movable relative to said primary and secondary hydraulic plunger means to cause said cylinder to move into engagement with said second mold half upon movement thereof over said plunger and also cause an injection operation upon continued movement of the cylinder.

8. An injection molding apparatus comprising movable mold members, a first fluid operable pressure member, a second fluid operable pressure member having a smaller pressure area than said first member, said mold members being supported in spaced arrangement by said two pressure members and movable thereby selectively relative to each other or in unison with each other, an injection unit including a cylinder movable over a stationary plunger arranged to be actuated by the motion of said mold members when the latter engage each other, said actuation of the injection unit being produced by the difference in forced produced as a result of fluid pressure acting upon said first and second pressure members, and means for conveying fluid under pressure to said pressure members.

9. An injection molding apparatus comprising a fixed plunger, a movable injection cylinder reciprocable thereover, a set of movable mold members, and means to open and close said mold members and to reciprocate said mold members, when closed, with said injection cylinder relatively to said fixed plunger to effect an injection cycle, said means comprising a first cylinder piston assembly with fluid operable advancing and retracting means and a second fluid operable cylinder piston assembly arranged to oppose said first cylinder piston assembly, and a pressure supply and control system arranged to deliver pressure fluid to both said advancing and retracting means of said first cylinder piston assembly while delivering pressure fluid to said second cylinder piston assembly to overcome the force of the pressure fluid on the advancing side of said first cylinder piston assembly and thereby retract the same.

10. An injection molding apparatus comprising a fixed injection plunger, a reciprocable injection cylinder, a reciprocable pair of mold members, said mold members and said injection cylinder being arranged to move together relatively to said fixed plunger, a double acting and a single acting hydraulic motor means having piston areas of different area on the advancing side thereof whereby the motors oppose each other when pressure fluid is applied on the advancing sides thereof, means for simultaneously applying pressure to the advancing sides of all of said motor means for effecting a forward stroke with a terminal pressure dwell of said mold members and said injection cylinder at the end of the stroke, and means for simultaneously applying pressure to the advancing side of all of said motor means and to the retracting side of the double acting motor means whereby to effect a return stroke of all of said motors, and means to terminate the effect of the pressure applied on the retraction side of the said double acting motor means to affect a terminal pressure dwell of said mold members and said injection cylinder.

11. An injection molding apparatus comprising a fixed injection plunger, a reciprocable injection cylinder, a reciprocable pair of mold members, said mold members and said injection cylinder being arranged to move together relatively to said fixed plunger, a double acting and a single acting hydraulic motor means having piston areas of different area on the advancing side thereof whereby the motors oppose each other when pressure fluid is applied on the advancing sides thereof, means for simultaneously applying pressure to the advancing sides of all of said motor means for effecting a forward stroke with a terminal pressure dwell of said mold members and said injection cylinder at the end of the stroke, and means for simultaneously applying pressure to the advancing side of all of said motor means and to the retracting side of the double acting motor means whereby to effect a return stroke of all of said motors, and means to terminate the effect of the pressure applied on the retraction side of the said double acting motor means to affect a terminal pressure dwell of said mold members and said injection cylinder, and means to change the pressure applied on the advancing side of the motor means having the smaller area to change the differential between the opposed power effort of said first and second motor means to change the clamping pressure on said molds.

12. Injection molding apparatus comprising a fixed injection plunger, a first movable mold half, an injection cylinder between said mold half and said plunger and movable by said mold half over said injection plunger, a second movable mold half engageable with said first mold half and to carry said first mold half towards said plunger and said injection cylinder over said plunger, main hydraulic motor means for moving said second mold half towards said plunger, push-back hydraulic motor means of less area than and opposed to said main motor means for retracting said first mold half and spacing the same from said second mold half, cushioning motor means opposing said main motor means and aiding said push-back motor means, a pressure fluid source for selectively supplying pressure fluid to said main motor means and said push-back motor means and continuously supplying fluid to said cushioning motor means, and a four-way valve controlling the fluid connection between said main and push-back motor means and said fluid source and movable selectively into a first position to connect said source to both said main and push-back motor means, or into a second position for connecting said source to said main motor means while connecting said push-back motor means to discharge, said valve also being movable into a third position for connecting said source to said push-back motor means while connecting said main motor means to discharge.

13. Injection molding apparatus comprising a fixed injection plunger, a movable mold half, an injection cylinder between said plunger and said mold half, said cylinder being freely movable into engagement with said mold half but being limited in movement away from said mold half, cushioning hydraulic motor means having its motive element connected to said mold half, a second movable mold half on the side of said first-named mold half away from said plunger, main hydraulic motor means for moving said second mold half towards said plunger, push-back hydraulic motor means for retracting said mold half, said push-back motor means having a smaller effective area than said main motor means, a source of liquid pressure, means for connecting said source at all times to said cushioning means, means for connecting said source simultaneously to both said main and push-back means to cause clamping of said mold halves, means for thereafter disconnecting said push-back means from said source while connecting said main motor means to said source to cause injection, means for thereafter reconnecting said push-back means to said source to cause said push-back means in conjunction with said cushioning means to overcome said main means and cause retraction until the injection cylinder is retracted, and means for thereafter disconnecting said main motor means from said push-back motor means while connecting the latter to said source for causing unclamping of said mold halves and completion of retraction.

14. In an injection molding apparatus, mold members, a movable injection cylinder, a movable feed cylinder integral with said injection cylinder, a stationary injection plunger for cooperation with said injection cylinder, an oscillatable feed plunger for feeding unplasticized material from a container into said injection cylinder having a lost motion mechanism for operating the same, reciprocable power means, operable when acting in one direction, to effect the closing of said mold members, the traversing of said mold members to said injection cylinder and the moving of said integral injection cylinder and feed cylinder relatively to said injection plunger and said feed plunger, for supplying said mold members with plasticized material and for supplying said injection cylinder with unplasticized material, said lost motion mechanism including adjustable means operable automatically in response to operation of said feed cylinder for causing said feed plunger to feed material therefrom only when said mold members are being supplied with plasticized material.

15. In an injection molding apparatus, an injection unit having movable injection cylinder means and a stationary injection plunger means, feeder means for said injection unit, said feeder means including a chamber member movable coextensively with said injection cylinder means, and a piston member movable with said chamber member through an idling stroke during a part of the stroke of said injection cylinder over said injection plunger, and means associated with said piston member and adapted in response to a predetermined movement thereof to terminate the movement of said piston member, to thereby terminate the idling stroke of said piston member and affect a feeding stroke thereof during the remaining part of the stroke of said cylinder over said plunger.

WARREN R. TUCKER.